(12) United States Patent
Li et al.

(10) Patent No.: US 9,756,192 B2
(45) Date of Patent: Sep. 5, 2017

(54) ONLINE CHARGING FOR PROXIMITY SERVICES

(71) Applicant: Alcatel-Lucent USA Inc., Murray Hill, NJ (US)

(72) Inventors: Xiangyang Li, Beijing (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 193 days.

(21) Appl. No.: 14/586,292

(22) Filed: Dec. 30, 2014

(65) Prior Publication Data

US 2015/0326738 A1 Nov. 12, 2015

Related U.S. Application Data

(60) Provisional application No. 61/991,269, filed on May 9, 2014.

(51) Int. Cl.

| H04M 15/00 | (2006.01) |
| G06Q 20/32 | (2012.01) |
| H04W 4/00 | (2009.01) |
| H04W 8/00 | (2009.01) |
| H04W 4/24 | (2009.01) |
| H04L 12/14 | (2006.01) |

(52) U.S. Cl.
CPC .......... *H04M 15/93* (2013.01); *G06Q 20/327* (2013.01); *H04L 12/1403* (2013.01); *H04L 12/1467* (2013.01); *H04M 15/64* (2013.01); *H04W 4/008* (2013.01); *H04W 4/24* (2013.01); *H04W 8/005* (2013.01)

(58) Field of Classification Search
CPC ... H04M 15/93; H04M 15/64; H04L 12/1467; H04L 12/1403; H04W 4/24; H04W 4/008; H04W 8/005; G06Q 20/327
See application file for complete search history.

(56) References Cited

U.S. PATENT DOCUMENTS

2008/0147551 A1* 6/2008 Connelly ............... G06Q 20/10
705/44

OTHER PUBLICATIONS

3rd Generation Partnership Project, Feasibility Study for Proximity Services (ProSe), 3GPP TR 22.803, Version 12.2.0 (Jun. 2013).

(Continued)

*Primary Examiner* — Marcos Torres
(74) *Attorney, Agent, or Firm* — Duft Bornsen & Fettig, LLP

(57) ABSTRACT

Systems and methods for performing online charging for proximity services. One embodiment is a proximity service element that controls proximity services for a mobile network. The proximity service element receives a service request from User Equipment (UE) for a proximity service, and collects online charging information related to the proximity service. The proximity service element formats the online charging information into an online charging request, and transmits the online charging request to an online charging system. The proximity service element receives an online charging response from the online charging system that includes a credit authorization result for the proximity service, and transmits a service response to the UE indicating the credit authorization result for the proximity service.

20 Claims, 5 Drawing Sheets

(56) References Cited

OTHER PUBLICATIONS

3rd Generation Partnership Project, Proximity-based Services, 3GPP TS 23.303, Version 12.0.0 (Feb. 2014).
3rd Generation Partnership Project, Study on LTE Device to Device Proximity Services, 3GPP TR 36.843, Version 12.0.1 (Mar. 2014).

* cited by examiner

ONLINE CHARGING FOR PROXIMITY SERVICES

RELATED APPLICATIONS

This non-provisional patent application claims priority to U.S. Provisional Patent Application No. 61/991,269 filed on May 9, 2014, which is incorporated by reference as if fully provided herein.

FIELD OF THE INVENTION

The invention is related to the field of communication systems and, in particular, to charging for proximity services.

BACKGROUND

Proximity services or proximity-based services refer to services provided between devices (i.e., User Equipment (UE)) being in proximity to each other. Proximity services utilize the radio technologies of the UEs so that the UEs in close proximity can exchange communications directly with one another without going through the core network, which is also referred to as device-to-device (D2D) communications. A UE is considered in "proximity" of another UE if they are able to establish direct communications.

The Third Generation Partnership Program (3GPP) has defined Proximity Services (ProSe) for a Long Term Evolution (LTE) network. ProSe allows for D2D communications as an underlay to the cellular network. In D2D communications, UEs transmit data signals to each other over a direct link using the cellular resources instead of routing the data signals through the core network. Therefore, D2D communications involve directly transmitting traffic between UEs that are in the vicinity of one another instead of routing the traffic over a core network, such as the Evolved Packet Core (EPC). Because there is direct communication between UEs that are in close proximity, D2D communications offload traffic from the EPC network without additional infrastructure. D2D communications may also offer higher data rates, lower transfer delays, and better power efficiency within a UE.

Proximity services generally include direct discovery, direct communication, and UE-to-network relay. Direct discovery is a function where a UE identifies other UEs that are in proximity Direct communication is a function where UEs in proximity are able to communicate using local radio resources. UE-to-network relay is a function where a UE can relay traffic from a remote UE to the network, or from the network to the remote UE. For example, if a UE (referred to as a remote UE) is outside of the coverage area of the base stations for a network, then the UE-to-network relay function allows the remote UE to transmit traffic to a relay UE that is in the coverage area of a base station through a direct communication with the relay UE. The relay UE in turn forwards the traffic from the remote UE to the network by communicating with a base station of the network.

Although the 3GPP has defined proximity services and related architectures, the 3GPP has failed to define how to charge for proximity services.

SUMMARY

Embodiments described herein provide an online charging mechanism for proximity services. A proximity service element of a mobile network interacts with a UE that is enabled for a proximity service. For example, the UE may contact the proximity service element to request authorization for the proximity service, to request permission to initiate discovery of other UEs that are proximate, to request permission to initiate a direct communication with other UEs that are discovered as proximate, etc. The proximity service element includes a Charging Trigger Function (CTF) that is configured to trigger a charging event in response to one or more of these interactions with the UE involving the proximity service, and collects charging information that pertains to the proximity service. The proximity service element then provides the charging information to an online charging system for credit control regarding the proximity service.

One embodiment comprises a proximity service element configured to control proximity services for a mobile network. The proximity service element includes a controller configured to receive a service request for a proximity service from a UE, to collect online charging information related to the proximity service, to format the online charging information related to the proximity service into an online charging request, and to transmit the online charging request to an online charging system (OCS). The controller is configured to receive an online charging response from the OCS that includes a credit authorization result for the proximity service, and to transmit a service response to the UE indicating the credit authorization result for the proximity service.

In another embodiment, the controller is configured to communicate with the online charging system over a Diameter Ro interface, and at least one Attribute Value Pair (AVP) is defined in the Diameter Ro interface for the online charging information related to the proximity service.

In another embodiment, an AVP may be defined for an application identifier for an application on the UE that is designed to perform functions of the proximity service, and an AVP may be defined for an application code used by the UE in a discovery procedure.

In another embodiment, an AVP may be defined for a charging identifier, wherein the charging identifier is a unique identifier assigned to the proximity service by the proximity service element.

In another embodiment, an AVP may be defined for a discovery model used by the UE in a discovery procedure, wherein the discovery model is selected between Model A and Model B as defined by the Third Generation Partnership Project (3GPP). An AVP may be defined for a discovery role type used by a UE during the discovery procedure according to the discovery model, wherein the discovery role type is selected between announcing, monitoring, and match report under Model A, or between discoverer and discoveree under Model B.

In another embodiment, an AVP may be defined for a direct communication type requested by the UE for a direct communication, wherein the direct communication type is selected between One-to-One, One-to-Many (or One-to-Group), and One-to-All.

In another embodiment, an AVP may be defined for a direct communication mode indicating whether the UE acts as a transmitter or receiver for a One-to-Many or One-to-All communication type.

In another embodiment, an AVP may be defined for a number of recipients for a One-to-Many communication type.

Another embodiment comprises a method for implementing online charging in a proximity service element of a mobile network that is configured to control proximity services for the mobile network. The method includes receiving (in a proximity service element) a service request for a proximity service from a UE, collecting online charging information related to the proximity service, formatting the online charging information into an online charging request, and transmitting the online charging request from the proximity service element to an OCS. The method further includes receiving an online charging response in the proximity service element from the OCS that includes a credit authorization result for the proximity service, and transmitting a service response from the proximity service element to the UE indicating the credit authorization result for the proximity service.

Another embodiment comprises an OCS configured to communicate with a proximity service element that controls proximity services for a mobile network. The OCS is configured to receive an online charging request from the proximity service element that includes online charging information for a proximity service involving User Equipment (UE), to identify a charging policy applicable to the proximity service, to determine whether credit authorization is granted for the proximity service based on the charging policy to generate a credit authorization result, and to transmit an online charging response to the proximity service element indicating the credit authorization result for the proximity service.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
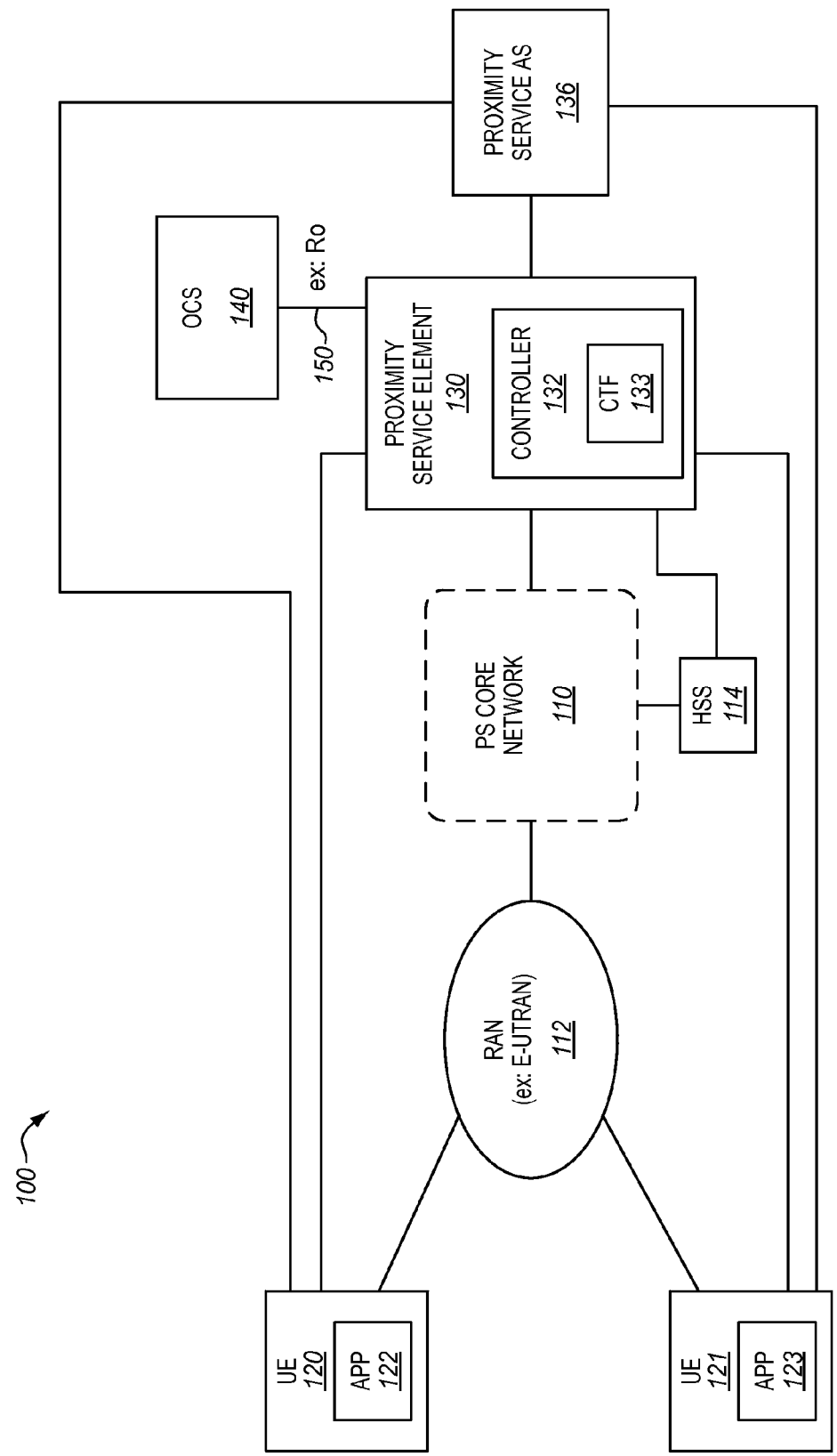
FIG. 1 illustrates an architecture of a mobile network for proximity services in an exemplary embodiment.

FIG. 1 illustrates an architecture of a mobile network 100 (e.g., Public Land Mobile Network (PLMN)) that provides proximity services. Mobile network 100 includes a Packet-Switched (PS) core network 110, such as an Evolved Packet Core (EPC), that communicates with UEs 120-121 over a Radio Access Network (RAN) 112. One example of RAN 112 is an Evolved-UMTS Terrestrial Radio Access Network (E-UTRAN). Although not shown in FIG. 1, RAN 112 includes a plurality of base stations (e.g., eNodeB) that provide wireless connections between UEs 120-121 (and other UEs) and PS core network 110. PS core network 110 may include one or more network elements that serve UEs 120-121, such as a Mobility Management Entity (MME), a Serving Gateway (S-GW), a Packet Data Network Gateway (P-GW), etc. Mobile network 100 also includes a Home Subscriber Server (HSS) 114 that stores profiles for subscribers of mobile network 100.

The architecture shown in FIG. 1 illustrates a non-roaming scenario. However, there may be other architectures applicable to the embodiments described herein, such as an inter-PLMN architecture, a roaming architecture, an architecture when a UE is covered by a WLAN instead of RAN 112, etc. Similar scenarios are shown in 3GPP TS 23.303 (v12.0.0), which is incorporated by reference as if fully included herein.

Mobile network 100 further includes a proximity service element 130 and a proximity service Application Server (AS) 136. Proximity service element 130 comprises any server, device, apparatus, or equipment (including hardware) that is used for network-related actions required for proximity services. Proximity service element 130 may play different roles for controlling the features of a proximity service. For example, proximity service element 130 may authorize and provision a UE that requests a proximity service. Proximity service element 130 may authorize and provision a UE that requests to initiate a discovery procedure for the proximity service. Proximity service element 130 may authorize and provision a UE that requests to initiate a direct communication for the proximity service. Proximity service AS 136 comprises any server, device, apparatus, or equipment (including hardware) that supports proximity service element 130 in providing proximity services.

UEs 120-121 comprise any devices used directly by an end user for communication, such as a mobile terminal, a laptop computer equipped with a mobile broadband adapter, etc. UEs 120-121 are considered enabled for proximity services, meaning that they support the requirements and associated procedures for one or more proximity services. Each UE 120-121 includes an application 122 and 123, respectively, that is used to access/provide a proximity service. The applications 122-123 may be configured for a local voice service, multimedia content sharing, gaming, group multicast, content-aware applications, public safety, etc. As an example, application 122 may provide a proximity service where a department store can directly send a message to UE 120 through application 122 when UE 120 is proximate to the department store. As another example, application 122 may comprise a social network application (e.g., Facebook®) that allows for direct communication with another UE.

Mobile network 100 is enhanced in this embodiment to implement online charging for proximity services. For one enhancement, a controller 132 in proximity service element 130 implements a Charging Trigger Function (CTF) 133 for online charging. A CTF is a component that detects chargeable events for services, assembles information for the chargeable events into matching charging events, and sends the charging events to an Online Charging Function (OCF) in order to obtain authorization for the chargeable events requested by a user. CTF 133 is configured to trigger on events related to a proximity service, to collect information regarding the proximity service, and report the information to the OCF. CTF 133 is also able to track the availability of resource usage permission ("quota supervision") during the resource usage, and enforce termination of the end user's resource usage when permission by the OCF is not granted or expires.

Another enhancement in this embodiment is that mobile network 100 includes an Online Charging System (OCS) 140. OCS 140 comprises a server, device, apparatus, or equipment (including hardware) that provides online charging for proximity services provided in mobile network 100. Online charging is a charging mechanism where charging information can affect, in real-time, the service rendered and therefore a direct interaction of the charging mechanism with session/service control is required. Online charging can be of two types: session-based or event-based. In event-based charging, a CTF reports a charging event for a single operation. In session-based charging, a CTF reports multiple charging events for a session. A further discussion of charging principles is described in 3GPP TS 32.240, which is incorporated by reference as if fully included herein.

Yet another enhancement in mobile network 100 is an interface 150 or reference point defined between proximity service element 130 and OCS 140. The interface 150 as described herein allows proximity service element 130 to provide online charging information to OCS 140 that is related to a proximity service. For example, interface 150 may comprise a Diameter Ro interface that is enhanced with one or more new Attribute Value Pairs (AVPs) that are defined for charging information related to a proximity service.

The online charging principles discussed herein may be for scenarios where UEs are served by E-UTRAN or non-E-UTRAN, where UEs are located in a Home PLMN (HPLMN) or Visited PLMN (VPLMN), where UEs act as a transmitter or receiver in a direct communication, where UEs belong to one or multiple PLMNs, where UEs are grouped together by an Application ID with assigned Application code(s) from a HPLMN proximity service element, etc.

The architecture shown in FIG. 1 may resemble the architecture described in 3GPP TS 23.303 for Proximity Services (ProSe). Although the architecture may comply with 3GPP specifications, the concepts discussed herein are applicable to any proximity service that enables direct communication between end user devices.

Proximity services as discussed herein include the following functions: discovery, direct communication (D2D), and UE-to-network relay. Discovery is a process that identifies a UE in proximity of other UEs. One type of discovery is direct discovery, which is a process employed by a UE to discover other UEs in its vicinity by using only the capabilities of the two UEs. For example, one UE may use local radio resources to discover the presence of other UEs in its vicinity. Another type of discovery (referred to by the 3GPP as EPC-level discovery) uses a server in the network to monitor the location of UEs, and inform the UEs of their proximity.

Direct communication is a communication between two or more UEs in proximity by means of user data plane transmission using radio technology (e.g., E-UTRA) via a channel not traversing any network node (other than possibly a base station of a RAN). Direct communication allows the UEs to use local radio resources to communicate directly with each other without routing traffic through a core network, such as PS core network 110. For example, UEs may directly communicate through the radio resources available to both UEs from a RAN, such as from a base station. UEs may also directly communicate through the radio resources of the UEs themselves. Either way, the traffic exchanged between the UEs is not routed through the core network, but is routed directly between the UEs over a wireless interface.

Figure 2:
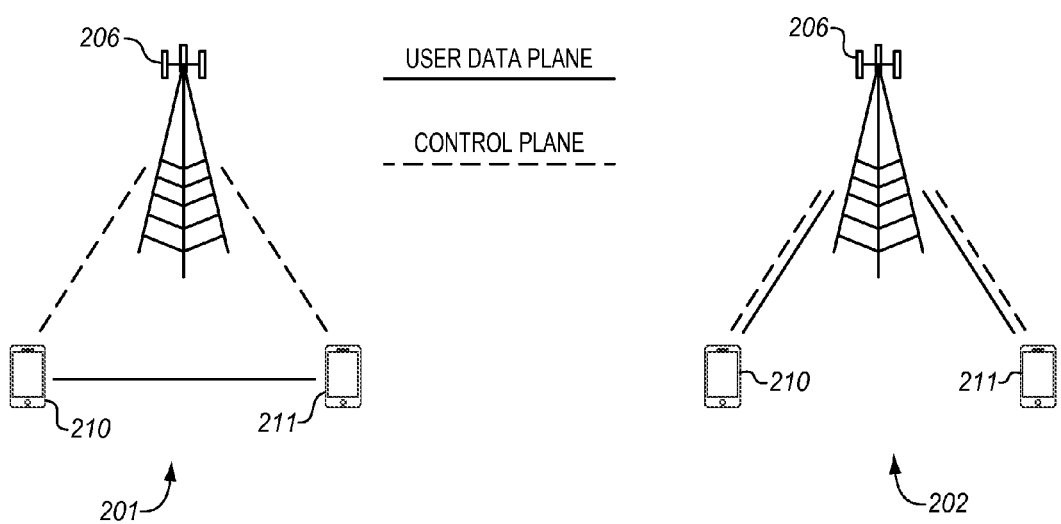
FIG. 2 illustrates direct communication scenarios between two UEs.

FIG. 2 illustrates direct communication scenarios between two UEs. In scenario 201, a base station 206 is in communication with UEs 210-211. Base station 206 communicates with UEs 210-211 over the control plane (also referred to as control path or control channel) to exchange signaling messages and other types of control messages with UEs 210-211. UEs 210-211 are able to establish a direct communication over a user data plane (also referred to as a data path or data channel) using local radio resources to communicate directly with each other without routing traffic through a core network. In scenario 202, base station 206 again communicates with UEs 210-211 over the control plane to exchange signaling messages and other types of control messages with UEs 210-211. UEs 210-211 are able to establish a direct communication over the user data plane through base station 206 without routing traffic through a core network. In each of the above scenarios, UEs 210-211 establish a direct communication between each other, which is also referred to herein as a D2D communication.

UE-to-network relay is a function where one UE provides functionality to support connectivity to "unicast" services for one or more remote UEs. A remote UE refers to a UE that is not served by a RAN (e.g., E-UTRAN), and communicates with the network through a UE-to-network relay. For instance, if a remote UE is out-of-coverage of a RAN, then the remote UE may still access the PDN through another UE (relay UE) that is in-coverage of the RAN. A relay UE is a device that is enabled for UE-to-network relay. UE-to-network relay allows for communications from the network to a remote UE via a relay UE which is in-coverage, or from a remote UE to the network via a relay UE that is in-coverage. Therefore, the term "UE-to-network relay" refers to communication from a remote UE to the network, and from the network to the remote UE.

For this embodiment, it is assumed that UE 120 wants to initiate a proximity service, such as a direct communication with UE 121. UE 120 is programmed to contact proximity service element 130 when initiating a proximity service. UE 120 may contact proximity service element 130 to request authorization for a proximity service, to request authorization to perform discovery for a proximity service (e.g., Announce request, Monitor request, or Match report), to request authorization to initiate a direct communication for a proximity service (e.g., One-to-One, One-to-Many, or One-to-All), etc. Thus, UE 120 may send different types of requests to proximity service element 130 regarding a proximity service over the control plane. Proximity service element 130 is enhanced to initiate online charging in response to one or more requests from UE 120.

Figure 3:
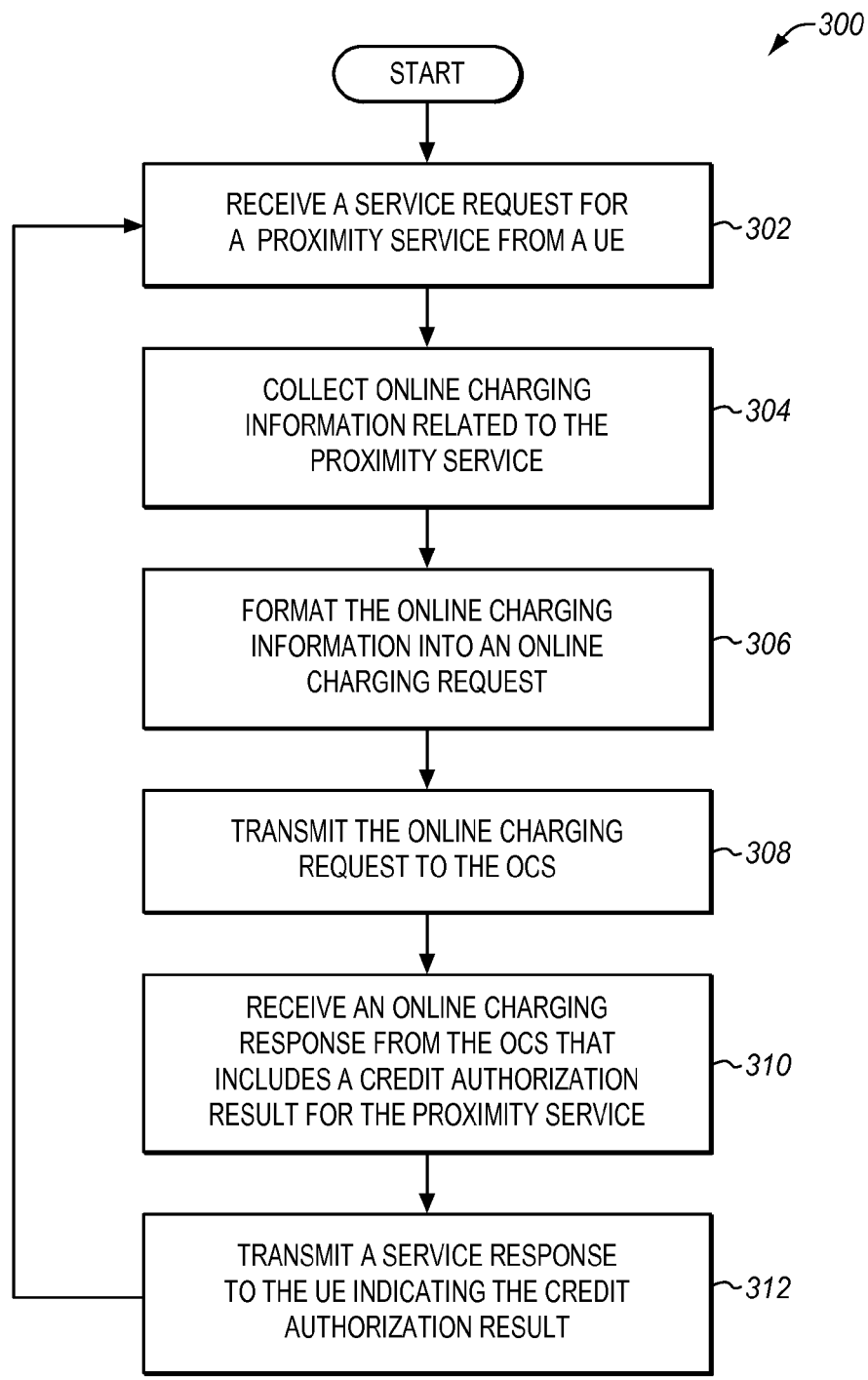
FIG. 3 is a flow chart illustrating a method for requesting authorization for a proximity service from an OCS in an exemplary embodiment.

FIG. 3 is a flow chart illustrating a method 300 for requesting authorization for a proximity service from an OCS in an exemplary embodiment. The steps of method 300 will be described with reference to proximity service element 130 in FIG. 1, but those skilled in the art will appreciate that method 300 may be performed in other systems. Also, the steps of the flow charts described herein are not all inclusive and may include other steps not shown, and the steps may be performed in an alternative order.

Controller 132 in proximity service element 130 receives a service request for the proximity service from UE 120 (step 302). Proximity service element 130 may identify the end user of UE 120 as an online charging user based on subscriber profile, service type, Time of Day (ToD), etc. When the end user subscribes to online charging, CTF 133 in proximity service element 130 is programmed to trigger on certain chargeable events related to proximity services. Thus, CTF 133 triggers on receipt of the service request from UE 120. Controller 132 (through CTF 133) collects online charging information related to the proximity service (step 304). The online charging information comprises any information that an online charging function may use to perform credit control for a proximity service. The online charging information, at least in part, may apply solely to a proximity service (as opposed to a regular session over mobile network 100). To illustrate examples of online charging information, CTF 133 may collect an identity of the mobile subscriber (e.g., IMSI), identity of the PLMN (e.g., mobile network 100), the type of feature requested (e.g., discovery, direct communication, or both), the model of direct discovery used by the UE (e.g., Model A or Model B), the role of the UE in a discovery procedure (e.g., Announcing UE, Monitoring UE, or Match Report), an Application ID used in direct discovery, an Application code allocated to an Announcing UE, an Application code(s) and timestamp(s) reported by a Monitoring UE in a Match Report, a type of direct communication requested by a UE (e.g., One-to-One, One-to-Many or One-to-All), an identity of participants in a group (e.g., for a One-to-Many direct communication), etc. Any desired information may be collected for the proximity service that may be used to determine a tariff or issue credit for the proximity service. A more detailed discussion of the online charging information is provided later in this specification.

After collecting the online charging information, controller 132 formats the online charging information into an online charging request (step 306). An online charging request comprises a message that requests authorization for a service from an OCS. One example of an online charging request is a Diameter Ro Credit Control Request (CCR). Controller 132 may therefore format the online charging information related to the proximity service into Attribute Value Pairs (AVP) of the CCR. Controller 132 then transmits the online charging request to OCS 140 (step 308).

Figure 4:
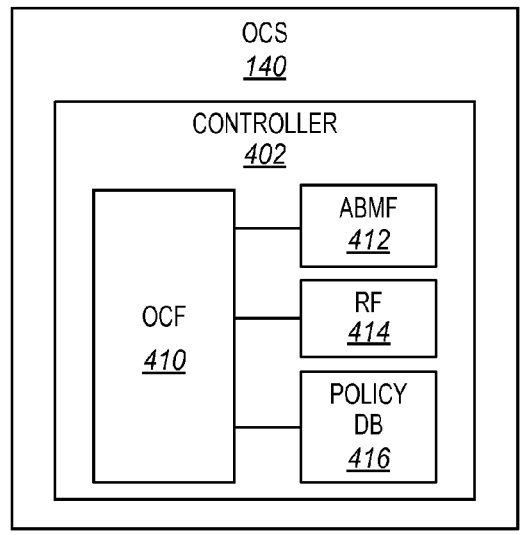
FIG. 4 is a schematic diagram of an OCS in an exemplary embodiment.

FIG. 4 is a schematic diagram of OCS 140 in an exemplary embodiment. OCS 140 includes a controller 402 that implements an Online Charging Function (OCF) 410, an Account Balance Management Function (ABMF) 412, and a Rating Function (RF) 414. OCF 410 represents the function that controls session-based and event-based charging (e.g., Session Based Charging Function (SBCF) and Event Based Charging Function (EBCF)). ABMF 412 is the location of the subscriber's account balance within OCS 140. RF 414 determines the value of the resource usage (described in the charging event received by OCF 410) on behalf of OCF 410 according to a tariff defined by the network operator. OCF 410 furnishes the information obtained from the charging event to RF 414, and receives in return the rating output (monetary or non-monetary units). RF 414 may handle the rating of data volume, rating of session/connection time, rating of service events, etc.

Figure 5:
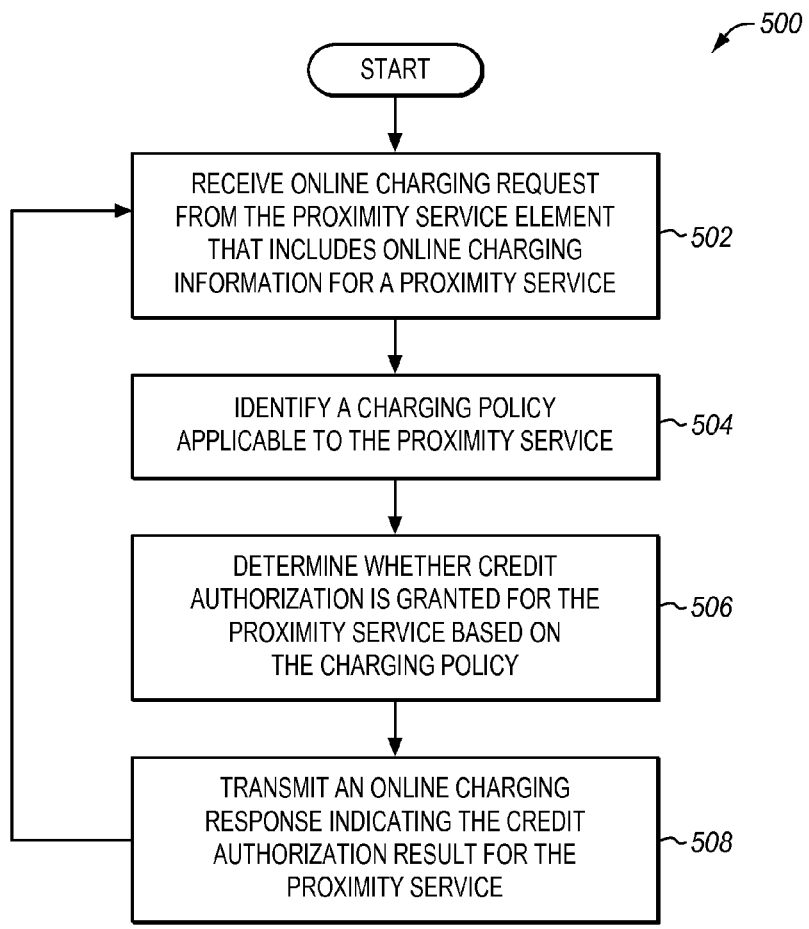
FIG. 5 is a flow chart illustrating a method for charging for a proximity service in an exemplary embodiment.

Controller 402 in OCS 140 also implements a policy database (DB) 416 for proximity services. Policy database 416 stores charging policies (or charging rules) defining how online charging is performed for proximity services. The charging policies for proximity services may be provisioned at OCS 140 for individual subscribers and/or for groups of subscribers. The charging policies may authorize proximity services or apply different rates based on any combination of the following criteria:

Proximity services versus for other services (non-proximity)
Request for discovery or direct communication
Request for discovery role as announcing, monitoring, or match report for Model A, or as discoverer or discoveree for Model B
Request for direct communication as One-to-One, One-to-Many, or One-to All
Recipients are on-network, off-network, or international
Number of recipients
Application ID or Application code
Location of UE
Range classes in discovery
Home PLMN or visited PLMN
Per user, per event, flat rate billing, duration-based billing within proximity service validity period
The UE is "served by E-UTRAN" or "not served by E-UTRAN"
Class of service for UE FIG. 5 is a flow chart illustrating a method 500 for charging for a proximity service in an exemplary embodiment. The steps of method 500 will be described with reference to OCS 140 in FIG. 4, but those skilled in the art will appreciate that method 500 may be performed in other systems.

Controller 402 receives the online charging request from proximity service element 130 (step 502). In response to the online charging request, controller 402 identifies a charging policy applicable to the proximity service (step 504) that is applicable to UE 120 or the end user/subscriber of UE 120. For example, controller 402 may identify a subscriber ID from the online charging request that is assigned to UE 120 or the end user of UE 120, and retrieve a charging policy from policy database 416 based on the subscriber ID. In another example, controller 402 may identify a group ID from the online charging request, and retrieve a charging policy from policy database 416 based on the group ID.

After identifying the charging policy, controller 402 determines whether the proximity service is authorized for the UE based on the charging policy (step 506). When determining whether the proximity service is authorized, controller 402 may process the online charging information from the online charging request as well as the charging policy to determine whether credit is authorized for the proximity service. For example, if the UE is located in a VPLMN and not in a HPLMN, then the charging policy may specify that credit is not authorized for the proximity service. Controller 402 may also process the online charging information to determine whether there is a sufficient balance in the account for the end user. For example, controller 402 may identify an account balance for the end user in ABMF 412, which represents the amount of money or other service units that the user has purchased in advance. Controller 402 (through RF 414) may also identify a tariff for the proximity service based on the charging policy. For instance, the charging policy may indicate one tariff that is applied to a proximity service when a UE is served by an E-UTRAN, and another tariff that is applied to the proximity service when a UE is not served by an E-UTRAN. If the account balance is sufficient based on the tariff identified for the proximity service, then controller 402 (through OCF 410) may determine that credit is authorized for the proximity service. Controller 402 may also grant a quota of service units for the proximity service when credit is authorized. This mechanism for determining whether a proximity service is authorized based on the charging policy within OCS 140 is referred to as a credit authorization.

Controller 402 then transmits an online charging response to proximity service element 130 indicating the credit authorization result for the proximity service (step 508). One example of an online charging response is a Diameter Ro Credit Control Answer (CCA), which includes one or more AVPs that indicate the credit authorization result. The credit authorization result in this embodiment may indicate that the proximity service is authorized to the UE based on the charging policy, or may indicate that the proximity service is denied based on the charging policy. The credit authorization result may also indicate a quota of service units that is granted for the proximity service.

In FIG. 3, controller 132 within proximity service element 130 receives the online charging response from OCS 140 (step 310). The online charging response indicates the credit authorization result from OCS 140 based on the charging policy. Controller 132 transmits a service response to UE 120 indicating the credit authorization result (step 312). The service response to UE 120 may also indicate a credit quota granted by OCS 140 for the proximity service (if authorized), may indicate an Application ID associated with the proximity service, may indicate an Application code for a discovery procedure, etc. UE 120 may then proceed based on the authorization provided by OCS 140.

The embodiment described above advantageously allows for online charging for proximity services. Because proximity service element triggers a charging event toward OCS 140 upon a request from UE 120, OCS 140 is able to perform credit authorization for the proximity service. Therefore, a network operator can charge prepaid accounts for its subscribers that utilize proximity services, such as direct or D2D communications.

This embodiment supports different charging modes at OCS 140: event-based charging (one-stage or two-stage) or session-based charging. One-stage charging includes Immediate Event Charging (IEC) where a CTF sends a one-time request to OCS 140. In response to the request, OCS 140 may directly debit an account of an end user if credit is authorized. If resource usage cannot be performed, the CTF is able to communicate with OCS 140 to refund the account of the end user. Two-stage charging includes Event Charging with Unit Reservation (ECUR) where a CTF issues a request that indicates the desired amount of units to reserve for resource usage, and the OCS blocks this amount from the account of the end user. Upon service delivery, the CTF issues another request which indicates how many units were actually consumed, and the OCS actually debits the account of the end user. Session-based charging includes Session Charging with Unit Reservation (SCUR), which is similar to ECUR but reservation may happen more than once.

The embodiments described above advantageously allow for online charging for a proximity service because proximity service element 130 is able to transfer online charging information for the proximity service to OCS 140. The content of the online charging information may vary as desired. In one example, the online charging information may include the following data:

Application ID
    Application Code
    Filter ID
    Event/Session ID
    Charging ID
    Discovery Model (Model A or Model B)
    Discovery Role Type (Announcing/Monitoring/Match Report or discoverer/discoveree)
    Direct Communication Type (One-to-One, One-to-Many, or One-to-All)
    Subscriber ID
    Subscriber Mode (Transmitter or Receiver)
    Number of Recipients
    Subscriber PLMN ID
    Function ID
    Subscriber Location Information
    Served Network Type (E-UTRAN or non-E-UTRAN)
    Timestamps In order to send this type of online charging information to OCS 140, new AVPs may be defined for the Diameter Ro reference point (also referred to as the Diameter Ro interface) to transport the online charging information. The following lists some exemplary AVPs that are newly-defined herein for Diameter Ro.

A new AVP may be defined for an Application ID associated with a proximity service. The Application ID is a globally unique identifier for a specific application (e.g., executing on a UE) designed to perform the functions of a proximity service.

A new AVP may be defined for an Application code associated with a proximity service. The Application code is a code used in a discovery procedure for an announcing UE, and is contained in the message that is actually transmitted over the radio interface by an announcing UE engaged in a discovery procedure to monitoring UEs. The Application code may be composed of a temporary identity that corresponds with the Application ID, and the PLMN ID of the proximity service element that assigned the application code (e.g., Mobile Country Code (MCC) and Mobile Network Code (MNC)). A proximity service element allocates an Application code per announcing UE and per application, and also allocates an associated validity timer that runs both in the proximity service element and in the UE. This AVP may also indicate the validity timer associated with the Application code.

A new AVP may be defined for a Filter ID associated with a proximity service. The Filter ID is used in a discovery procedure, and includes Application Code(s) or mask(s) that a UE monitors during a discovery procedure. When a UE detects that one or more Application Code(s) match the filter, the UE reports the Application Code(s) to a proximity service element.

A new AVP may be defined for an Event ID or Session ID assigned to the proximity service.

A new AVP may be defined for a Charging ID assigned to the proximity service. The Charging ID is a unique charging identifier for a proximity service. The Charging ID may be a string that combines the Application ID, the Application code, and the Event/Session ID. A proximity service element assigns a Charging ID for the event or session. The first UE involved in the event or session will receive the Charging ID from the proximity service element. If involved in a group communication, the UE will transfer the Charging ID to other UEs in the group for the event or session.

A new AVP may be defined for a Discovery Model used by a UE during a discovery procedure. For example, the 3GPP has defined two models for direct discovery (see 3GPP TS 23.303). The first is Model A, which uses the methodology of "I am here". The "announcing" UE broadcasts discovery messages at pre-defined discovery intervals and the "monitoring" UEs that are interested in these messages read and process them. Therefore, the announcing UE broadcasts information about itself. The second is Model B, which uses the methodology of "who is there?" or "are you there?". The "discoverer" UE sends information about other UEs that it would like to receive responses from. "Discoveree" UEs that are proximate to the discoverer UE may then respond with information related to the discoverer's request. This AVP may indicate whether a UE uses Model A or Model B for discovery.

A new AVP may be defined for a Discovery Role Type used by a UE during a discovery procedure. Model A defines roles for UEs that are participating in direct discovery. One role is as an announcing UE, where the UE announces certain information that could be used by UEs in proximity that have permission to discover. Another role is a monitoring UE, where the UE monitors certain information of interest in proximity of announcing UEs. Another role is a "Match report". A Match report is used by a monitoring UE when the Application code(s) that matches the Discovery Filter(s) does not have Application ID(s) already locally stored that correspond to the Application Code(s). Therefore, this AVP may indicate whether a UE requests the role as announcing, monitoring, or match report under Model A. Model B also defines two roles for UEs that are participating in direct discovery. One role is as a discoverer UE, where the UE transmits a request containing certain information about what it is interested to discover. The other role is a discoveree UE, where the UE that receives the request message can respond with some information related to the discoverer's request. Therefore, this AVP may indicate whether a UE is a discoverer or a discoveree UE under Model B.

A new AVP may be defined for a Direct Communication Type requested or used by a UE for a direct communication. Examples of direct communication types include: One-to-One, One-to-Many (or One-to-Group), and One-to-All. One-to-One is a direct communication between two UEs, where the bearers for the communication are bi-directional. IP packets passed to the radio layers on a given bearer will be transmitted by the physical layer with the associated L2 destination address. IP packets passed up from the radio layers on the same bearer will have been received over-the-air addressed to the same Layer-2 destination. One-to-Many is a multicast communication where an originating UE transmits IP data to an IP multicast address using the Layer-2 Group ID as the Destination Layer-2 ID. A receiving UE listens to the allocated radio resource to receive the One-to-Many direct communication. The receiving UE filters out the received packet based on the Layer-2 Group ID contained in the Destination Layer-2 ID. If it matches the Group IDs, then the packets are delivered to upper layers. The user plane packets will be delivered to the IP stack that filters the packets based on the Group IP multicast address. One-to-All is a direct communication where a UE broadcasts a communication to all authorized UEs in proximity.

A new AVP may be defined for the Mode of Direct Communication for a UE involved in a proximity service. For a One-to-Many or One-to-All communication, a UE may be an originating (or transmitting) UE or a receiving UE. In other words, the UE is either transmitting packets to one or more UEs, or is listening for packets being transmitting by another UE. This AVP indicates whether a UE is a transmitting or receiving UE for a direct communication.

A new AVP may be defined for a Number of Recipients of a One-to-Many communication.

New AVPs may be defined for any other online charging information discussed above.

EXAMPLES

Figure 6:
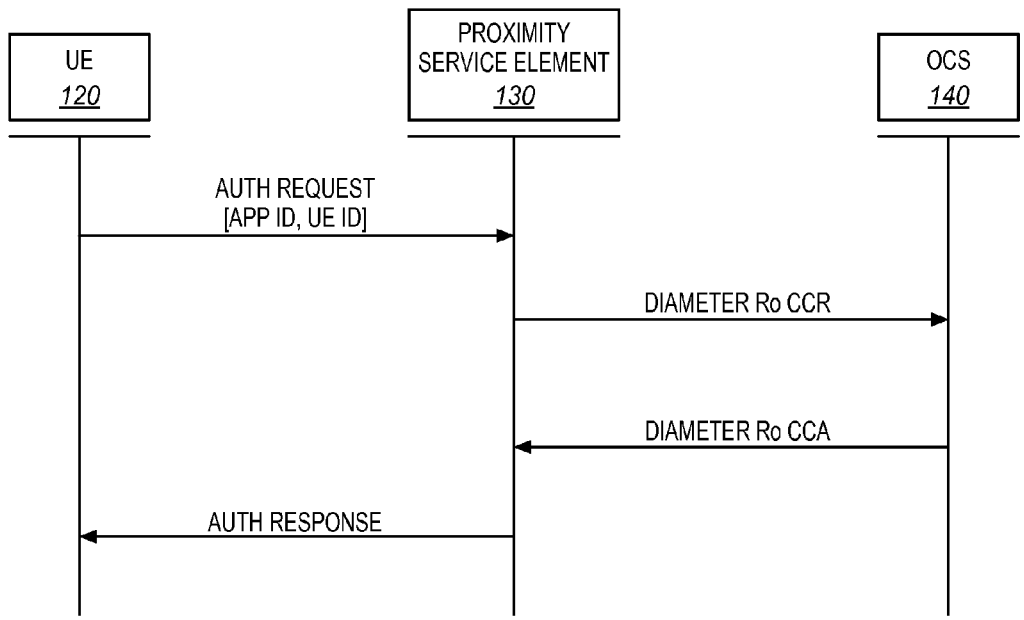
FIGS. 6-7 are message diagrams illustrating online charging for a proximity service in an exemplary embodiment.

FIG. 6 is a message diagram illustrating online charging for a proximity service in an exemplary embodiment. To begin, UE 120 sends an authorization request for the proximity service to proximity service element 130. The authorization request may include an Application ID for the proximity service, a UE ID, or other information related to UE 120 or a proximity service requested by UE 120. UE 120 gets service authorization for direct discovery and/or direct communication with a validity time from proximity service element 130 (of its HPLMN). The service authorization procedure is executed before starting the setup of direct discovery or direct communication, when UE 120 is already engaged in a direct discovery or direct communication and changes its registered PLMN, or when the service authorization is no longer valid. In response to the authorization request, proximity service element 130 (through its CTF 133) collects online charging information related to the proximity service being requested by UE 120. Proximity service element 130 then formats the online charging information into a Diameter Ro CCR. The Diameter Ro CCR includes at least one or more of the following newly-defined AVPs: Application ID, Application Code, Filter ID, Event/Session ID, Charging ID, Discovery Model, Discovery Role Type, Direct Communication Type, Subscriber Mode, and Number of Recipients. Proximity service element 130 then transmits the CCR to OCS 140.

In response to the CCR, OCS 140 determines whether credit is authorized for the proximity service based on a charging policy. For example, if the account balance for the subscriber is enough to fund the proximity service, then OCS 140 may determine that credit is authorized for the proximity service and may determine a credit quota for UE 120. If the account balance is not enough to fund the proximity service, then OCS 140 may determine that credit is not authorized for the proximity service. OCS 140 returns a Diameter Ro Credit Control Answer (CCA) to proximity service element 130 with the credit authorization result. The CCA may include one or more newly-defined AVPs that indicate the credit authorization result.

In response to the CCA, proximity service element 130 sends an authorization response to UE 120 with the credit authorization result (i.e., authorized or rejected/failed). If credit is granted by OCS 140, then UE 120 may initiate the proximity service.

Figure 7:
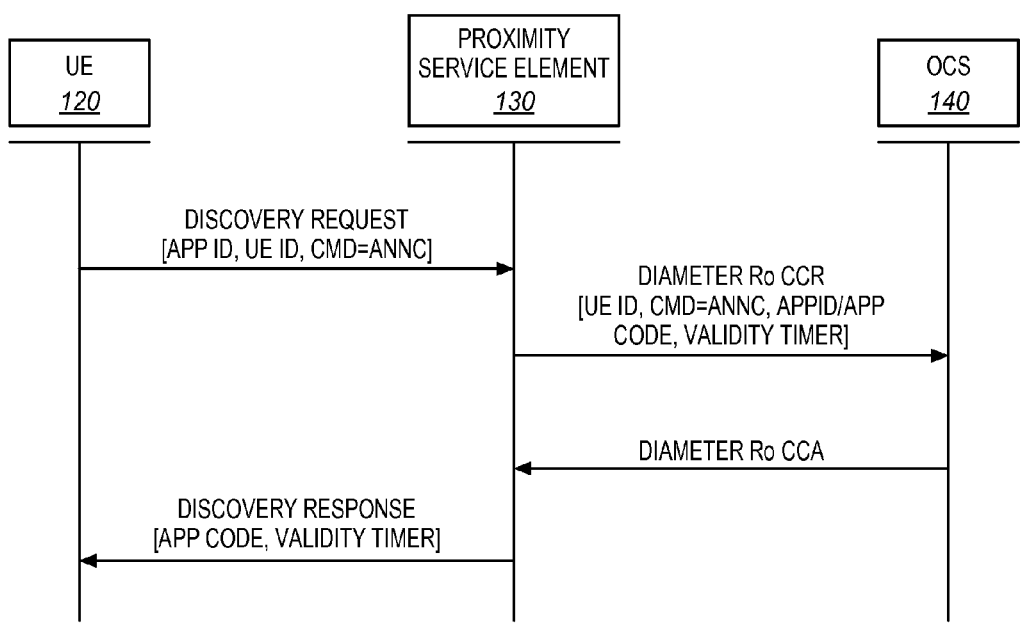

FIG. 7 is another message diagram illustrating online charging for a proximity service in an exemplary embodiment. To begin, UE 120 sends a discovery request for a proximity service to proximity service element 130. The discovery request may include an Application ID for the proximity service, a UE ID, a command for a role as an announcing UE, etc. If there is no associated UE context, then proximity service element 130 sends a Diameter Ro CCR to OCS 140 for credit authorization. Within the AVPs of the CCR, the UE ID identifies the UE subscription, the command for discovery is set for "announcing", the Application ID indicates the application that initiates the proximity service, the Application code indicates the code used for discovery, and the validity timer indicates how long the Application code is valid. OCS 140 determines whether the discovery request is authorized for UE 120 based on a charging policy. OCS 140 then returns the credit authorization result to proximity service element 130 in a Diameter Ro CCA. If the discovery request is authorized, then proximity service element 130 responds to UE 120 with a discovery response that includes the Application code, validity timer, etc. UE 120 may then initiate the discovery procedure by announcing the Application code using the radio resources authorized and configured by proximity service element 130. If the discovery request is not authorized, then proximity service element 130 responds to UE 120 with a discovery response that includes a failure result.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
a proximity service server that connects to at least one network element of a mobile network that serves a plurality of User Equipment (UE);
the proximity service server is configured to control proximity services provided by the mobile network between UEs in proximity to each other, wherein the proximity services include direct communication between UEs in proximity to each other, using local radio resources; and
a Diameter Ro interface between the proximity service server and an online charging system enhanced with Attribute Value Pairs (AVPs) that are defined for the proximity services;
the proximity service server comprising:
a controller configured to receive a service request from a proximity service application executing on a UE to authorize a proximity service initiated by the UE, and to collect online charging information for the proximity service in response to receiving the service request, wherein the online charging information applies solely to the proximity service;
the controller is configured to format the online charging information for the proximity service into at least one of the AVPs of a Diameter Ro Credit Control Request (CCR) and to transmit the Diameter Ro CCR to the online charging system;
the controller is configured to receive a Diameter Ro Credit Control Answer (CCA) from the online charging system where at least one of the AVPs in the Diameter Ro CCA indicates a credit authorization result for the proximity service based on a charging policy identified for the proximity service, and to transmit a service response to the UE indicating the credit authorization result for the proximity service, wherein the credit authorization result indicates whether the UE is authorized to proceed with the proximity service.

2. The apparatus of claim 1 wherein:
the controller is configured to format the online charging information for the proximity service into:
an AVP defined for a filter identifier used in a discovery procedure, wherein the filter identifier includes application codes and masks that the UE monitors during the discovery procedure.

3. The apparatus of claim 1 wherein:
the controller is configured to format the online charging information for the proximity service into:
an AVP defined for an application identifier for the proximity service application on the UE that is designed to perform functions of the proximity service; and
an AVP defined for an application code used by the UE in a discovery procedure.

4. The apparatus of claim 1 wherein:
the controller is configured to format the online charging information for the proximity service into:
an AVP defined for a charging identifier, wherein the charging identifier is a unique identifier assigned to the proximity service by the proximity service server.

5. The apparatus of claim 1 wherein:
the controller is configured to format the online charging information for the proximity service into:
an AVP defined for a discovery model used by the UE in a discovery procedure, wherein the discovery model is selected between Model A and Model B as defined by the Third Generation Partnership Project (3GPP); and
an AVP defined for a discovery role type used by a UE during the discovery procedure according to the discovery model, wherein the discovery role type is selected between announcing, monitoring, and match report under Model A, or between discoverer and discoveree under Model B.

6. The apparatus of claim 1 wherein:
the controller is configured to format the online charging information for the proximity service into:
an AVP defined for a direct communication type requested by the UE for a direct communication, wherein the direct communication type is selected between One-to-One, One-to-Many, or One-to-All.

7. The apparatus of claim 6 wherein:
the controller is configured to format the online charging information for the proximity service into:

an AVP defined for a direct communication mode indicating whether the UE acts as a transmitter or receiver for a One-to-Many or One-to-All communication type.

8. The apparatus of claim 1 wherein:
the controller is configured to format the online charging information for the proximity service into:
an AVP defined for a number of recipients for a One-to-Many communication type.

9. A method for implementing online charging in a proximity service server of a mobile network, the method comprising:
controlling, by the proximity service server which connects to at least one network element of the mobile network that serves a plurality of User Equipment (UE), proximity services provided by the mobile network between UEs in proximity to each other, wherein the proximity services include direct communication between UEs in proximity to each other using local radio resources;
receiving, by the proximity service server, a service request from a proximity service application executing on a UE to authorize a proximity service initiated by the UE;
collecting, by the proximity service server, online charging information for the proximity service in response to receiving the service request, wherein the online charging information applies solely to the proximity service;
wherein a Diameter Ro interface is defined between the proximity service server and an online charging system that is enhanced with Attribute Value Pairs (AVPs) that are defined for the proximity services;
formatting, by the proximity service server, the online charging information for the proximity service into at least one of the AVPs of a Diameter Ro Credit Control Request (CCR);
transmitting the Diameter Ro CCR from the proximity service server to the online charging system;
receiving a Diameter Ro Credit Control Answer (CCA) in the proximity service server from the online charging system where at least one of the AVPs in the Diameter Ro CCA indicates a credit authorization result for the proximity service based on a charging policy identified for the proximity service; and
transmitting a service response from the proximity service server to the UE indicating the credit authorization result for the proximity service, wherein the credit authorization result indicates whether the UE is authorized to proceed with the proximity service.

10. The method of claim 9 wherein formatting the online charging information comprises:
formatting the online charging information into:
an AVP defined for a filter identifier used in a discovery procedure, wherein the filter identifier includes application codes and masks that the UE monitors during the discovery procedure.

11. The method of claim 9 wherein formatting the online charging information comprises:
formatting the online charging information into:
an AVP defined for an application identifier for the proximity service application on the UE that is designed to perform functions of the proximity service; and
an AVP defined for an application code used by the UE in a discovery procedure.

12. The method of claim 9 wherein formatting the online charging information comprises:
formatting the online charging information into:
an AVP defined for a charging identifier, wherein the charging identifier is a unique identifier assigned to the proximity service by the proximity service server.

13. The method of claim 9 wherein formatting the online charging information comprises:
formatting the online charging information into:
an AVP defined for a discovery model used by the UE in a discovery procedure, wherein the discovery model is selected between Model A and Model B as defined by the Third Generation Partnership Project (3GPP); and
an AVP defined for a discovery role type used by a UE during the discovery procedure according to the discovery model, wherein the discovery role type is selected between announcing, monitoring, and match report under Model A, or between discoverer and discoveree under Model B.

14. The method of claim 9 wherein formatting the online charging information comprises:
formatting the online charging information into:
an AVP defined for a direct communication type requested by the UE for a direct communication, wherein the direct communication type is selected between One-to-One, One-to-Many, or One-to-All.

15. The method of claim 14 wherein formatting the online charging information comprises:
formatting the online charging information into:
an AVP defined for a direct communication mode indicating whether the UE acts as a transmitter or receiver for a One-to-Many communication type.

16. The method of claim 9 wherein formatting the online charging information comprises:
formatting the online charging information into:
an AVP defined for a number of recipients for a One-to-Many communication type.

17. An apparatus comprising:
an Online Charging System (OCS) configured to communicate with a proximity service server that controls proximity services for a mobile network over a Diameter Ro interface enhanced with Attribute Value Pairs (AVPs) that are defined for the proximity services;
the OCS having a controller, and a policy database configured to store charging policies defining how online charging is performed for the proximity services;
the controller is configured to receive a Diameter Ro Credit Control Request (CCR) from the proximity service server that includes online charging information for a proximity service involving User Equipment (UE), wherein the online charging information for the proximity service is formatted into at least one of the AVPs of the Diameter Ro CCR;
the controller is configured to identify a charging policy from the policy database for the proximity service, to process the online charging information and the charging policy to determine whether credit authorization is granted for the proximity service and to generate a credit authorization result, and to transmit a Diameter Ro Credit Control Answer (CCA) to the proximity service server, wherein at least one of the AVPs in the Diameter Ro CCA indicates the credit authorization result for the proximity service.

18. The apparatus of claim 17 wherein:
the controller is configured to identify a tariff for the proximity service based on the charging policy.

19. The apparatus of claim 17 wherein:
the controller is configured to grant a quota of service units for the proximity service when credit is authorized.

20. The apparatus of claim 19 wherein:
the controller is configured to indicate the quota of service units in the credit authorization result.

* * * * *